(12) United States Patent
Bartlett et al.

(10) Patent No.: US 12,485,843 B2
(45) Date of Patent: Dec. 2, 2025

(54) SYSTEM AND METHOD FOR ESTIMATING OCCUPANT MOVEMENT IN RESPONSE TO AUTOMATIC EMERGENCY BRAKING

(71) Applicant: ZF Friedrichshafen AG, Friedrichshafen (DE)

(72) Inventors: Charles A. Bartlett, Commerce Township, MI (US); Kyeora Lee, Farmington Hills (KR); Kiran Balasubramanian, Canton, MI (US)

(73) Assignee: ZF Friedrichshafen AG, Friedrichshafen (DE)

( * ) Notice: Subject to any disclaimer, the term of this patent is extended or adjusted under 35 U.S.C. 154(b) by 80 days.

(21) Appl. No.: 18/277,818

(22) PCT Filed: Feb. 26, 2021

(86) PCT No.: PCT/IB2021/051633
§ 371 (c)(1),
(2) Date: Aug. 18, 2023

(87) PCT Pub. No.: WO2022/180429
PCT Pub. Date: Sep. 1, 2022

(65) Prior Publication Data
US 2024/0140344 A1    May 2, 2024

(51) Int. Cl.
*B60R 21/015*    (2006.01)
*B60T 17/18*    (2006.01)
*B60R 21/01*    (2006.01)

(52) U.S. Cl.
CPC ........ *B60R 21/01542* (2014.10); *B60T 17/18* (2013.01); *B60R 2021/01265* (2013.01); *B60T 2201/024* (2013.01)

(58) Field of Classification Search
CPC ..... B60R 21/01542; B60R 2021/01265; B60T 17/18; B60T 2201/024
See application file for complete search history.

(56) References Cited

U.S. PATENT DOCUMENTS

| 4,985,835 A | 1/1991 | Sterler et al. |
| 6,188,940 B1 | 2/2001 | Blackburn et al. |
| (Continued) | | |

FOREIGN PATENT DOCUMENTS

| DE | 102017011827 A1 | 6/2019 |
| EP | 0882624 A1 | 12/1998 |
| WO | 1993021043 A1 | 10/1993 |

OTHER PUBLICATIONS

International Search Report and Written Opinion for PCT/IB2021/051633 mailed Nov. 24, 2021 (11 pages).

*Primary Examiner* — Toan C To
(74) *Attorney, Agent, or Firm* — Kristin L. Murphy

(57) ABSTRACT

A method for controlling an actuatable safety device for protecting an occupant of a vehicle includes utilizing an advanced driver assistance system (ADAS) to determine that a vehicle collision is impending. In response to determining the existence of an impending vehicle collision, a mass spring damper model uses sensed vehicle longitudinal acceleration (IMU_X) to estimate the occupant movement that will result from the impending vehicle collision. The estimated occupant movement is used to determine how to control deployment of an actuatable safety device in response to the crash.

18 Claims, 4 Drawing Sheets

(56) References Cited

U.S. PATENT DOCUMENTS

| | | | | |
|---|---|---|---|---|
| 6,439,007 | B1* | 8/2002 | Foo | B60R 21/0132 |
| | | | | 280/735 |
| 6,496,764 | B1 | 12/2002 | Wang | |
| 12,083,985 | B2* | 9/2024 | Balasubramanian | B60W 30/08 |
| 2006/0253240 | A1* | 11/2006 | Rao | B60W 50/035 |
| | | | | 701/1 |
| 2007/0188348 | A1* | 8/2007 | Bauer | G08G 1/162 |
| | | | | 340/905 |
| 2009/0268947 | A1* | 10/2009 | Schaufler | G06V 20/56 |
| | | | | 382/104 |
| 2011/0035116 | A1* | 2/2011 | Leda | B60R 21/0134 |
| | | | | 701/45 |
| 2014/0309789 | A1* | 10/2014 | Ricci | G06Q 20/308 |
| | | | | 700/276 |
| 2016/0082912 | A1* | 3/2016 | Yoon | B60R 21/01 |
| | | | | 701/45 |
| 2019/0248315 | A1* | 8/2019 | Oesterle | B60N 2/10 |
| 2019/0359169 | A1* | 11/2019 | Schutera | B60R 21/01538 |
| 2020/0326702 | A1* | 10/2020 | Iwamoto | B60T 7/16 |
| 2021/0146918 | A1* | 5/2021 | Schulz | B60T 8/17 |

* cited by examiner

SYSTEM AND METHOD FOR ESTIMATING OCCUPANT MOVEMENT IN RESPONSE TO AUTOMATIC EMERGENCY BRAKING

CROSS-REFERENCE TO RELATED APPLICATIONS

This application is a national stage of International Application No. PCT/IB2021/051633, filed Feb. 26, 2021, the disclosure of which is incorporated herein by reference in its entirety.

TECHNICAL FIELD

This description relates to vehicle safety systems. More particularly, this description relates to a vehicle safety system and method for estimating the movement of a vehicle occupant when vehicle automatic emergency braking is activated.

BACKGROUND

Vehicle safety systems include actuatable restraints such as actuatable seatbelt retractors and airbags. Vehicle safety systems also include sensors for sensing vehicle and/or occupant conditions, and a controller that monitors signals provided by the sensors. Upon detecting a vehicle crash that crosses a threshold magnitude, the controller actuates the actuatable restraints to help protect the occupant.

Advanced driver assistance systems provide features, such as automatic emergency braking. Advanced driver assistance systems include sensors, such as radar/lidar sensors and camera sensors, for providing a sensed indication of areas surrounding the vehicle. Advanced driver assistance systems also include a controller that monitors signals provided by the sensors. To implement automatic emergency braking, the controller evaluates signals from the sensors to detect an impending front collision. When an impending front collision is detected, the controller causes the vehicle brakes to be applied automatically.

SUMMARY

A vehicle safety system implements a method for estimating occupant movement in response to automatic emergency braking. If a vehicle crash follows the emergency braking, the safety system can tailor the actuation of occupant restraints, such as actuatable seatbelts and/or airbags, in accordance with the estimated occupant movement.

According to one aspect, a method for controlling an actuatable safety device for protecting an occupant of a vehicle includes sensing an impending vehicle collision. The method also includes, in response to sensing the impending vehicle collision, calculating an estimated occupant movement that will result when the impending vehicle collision occurs. The method further includes controlling the actuatable safety device in response to the estimated occupant movement.

Sensing the impending vehicle collision can include receiving an automatic emergency braking (AEB) deceleration flag. Receiving the AEB deceleration flag can include polling an advanced driver assistance system (ADAS). The ADAS implements sensors that detect objects in the vicinity of the vehicle, calculates relative velocities between the detected objects and the vehicle to sense the impending vehicle collision, and outputs the AEB deceleration flag in response thereto. The AEB deceleration flag can be latched for a predetermined time period that estimates the duration of an AEB braking profile.

Sensing the impending vehicle collision can include receiving an automatic emergency braking (AEB) braking flag. The AEB deceleration flag can include polling a vehicle stability system for the AEB deceleration flag, which is flagged ON throughout the duration of an AEB braking profile.

Calculating the estimated occupant movement can include executing spring mass damper modeling to estimate the occupant movement. Executing spring mass damper modeling can include evaluating vehicle longitudinal acceleration (IMU_X) with a spring mass damper model to estimate the occupant movement.

Executing the spring mass damper modeling can include implementing a first spring mass damper model that estimates occupant head movement, and a second spring mass damper model that estimates occupant chest movement.

Executing the spring mass damper modeling can include implementing a first spring mass damper model that estimates occupant movement with the seatbelt in an unlocked condition allowing seatbelt webbing payout, and a second spring mass damper model that estimates occupant movement with the seatbelt in a locked condition blocking seatbelt webbing payout.

Executing the spring mass damper modeling can include executing a metric to that evaluates a magnitude of vehicle longitudinal acceleration (IMU_X) over time. The first spring mass damper model can be implemented in response to the magnitude of vehicle longitudinal acceleration remaining below a predetermined threshold associated with mechanical seatbelt locking. The second spring mass damper model can be implemented in response to the magnitude of vehicle longitudinal acceleration exceeding the predetermined threshold associated with mechanical seatbelt locking.

Executing the spring mass damper modeling can include polling an E-lock status of an actuatable controlled restraint seatbelt. The first spring mass damper model can be implemented in response to the E-lock status being OFF. The second spring mass damper model can be implemented in response to the E-lock status being ON.

The method can also include sensing a seatbelt buckle status and inhibiting the implementation of the second spring mass damper model in response to the seatbelt buckle status being unbuckled.

Executing the spring mass damper modeling can include implementing a first spring mass damper model that estimates occupant head movement with the seatbelt in an unlocked condition allowing seatbelt webbing payout; implementing a second spring mass damper model that estimates occupant chest movement with the seatbelt in an unlocked condition allowing seatbelt webbing payout; implementing a third spring mass damper model that estimates occupant head movement with the seatbelt in a locked condition blocking seatbelt webbing payout; and implementing a fourth spring mass damper model that estimates occupant chest movement with the seatbelt in a locked condition blocking seatbelt webbing payout.

Executing the spring mass damper modeling can include executing a metric to that evaluates a magnitude of vehicle longitudinal acceleration (IMU_X) over time. The first and second spring mass damper models can be implemented in response to the magnitude of vehicle longitudinal acceleration remaining below a predetermined threshold associated with mechanical seatbelt locking. The third and fourth spring mass damper models can be implemented in response to the magnitude of vehicle longitudinal acceleration exceeding the predetermined threshold associated with mechanical seatbelt locking.

Controlling the actuatable safety device in response to the estimated occupant movement can include any of the following:

Determining whether to actuate a first and/or second stage of an inflator for inflating an airbag.

Determining timing with which to actuate a first and/or second stage of an inflator for inflating an airbag.

Determining whether to actuate an actuatable vent for venting inflation fluid from an airbag.

Determining timing with which to actuate an actuatable vent for venting inflation fluid from an airbag.

Determining whether to actuate a seatbelt load limiter.

Determining whether to actuate a seatbelt pre-tensioner.

Determining whether to actuate an actuatable controlled restraint (ACR) to tighten a seatbelt onto the occupant.

Calculating the estimated occupant movement that will result when the impending vehicle collision occurs can include any of the following:

Implementing a sensed occupant weight to calculate the estimated occupant movement.

Implementing a sensed seat position to calculate an occupant position relative to vehicle structure.

Implementing a sensed seat inclination to calculate an occupant position relative to vehicle structure.

Implementing a sensed steering wheel and/or instrument panel position to calculate an occupant position relative to vehicle structure.

Implementing a sensed seatbelt buckle status to calculate the estimated occupant movement.

The method can also include polling an actuatable controlled restraint (ACR) indication of seatbelt payout and implementing the indicated seatbelt payout as feedback for the estimated occupant movement calculation.

A vehicle safety system includes an actuatable safety device, a sensor for sensing an impending vehicle collision, and a controller configured to perform the methods disclosed herein to control the actuatable safety device in response to the estimated occupant movement. The actuatable safety device can include any of the following: an airbag inflator, an actuatable airbag vent, an actuatable seatbelt retractor, an actuatable controlled restraint (ACR) comprising a seatbelt retractor. The sensor can include a sensor of an advanced driver assistance system (ADAS) configured to assist the driver in driving functions. The controller can include an airbag control unit (ACU).

A vehicle safety system includes an airbag module comprising an airbag and an inflator actuatable to provide inflation fluid for inflating and deploying the airbag, and an airbag control unit (ACU). The ACU is configured to control actuation of the inflator and the inflation and deployment of the airbag. The ACU includes an inertial monitoring unit (ACU) operative to measure a vehicle longitudinal acceleration and provide a vehicle longitudinal acceleration (IMU_X) value indicative thereof. The ACU is configured to obtain from at least one of an advanced driver assistance system (ADAS) and a vehicle stability control system a vehicle automatic emergency braking (AEB) indication. In response to the AEB indication, the ACU is configured to execute a mass spring damper model to calculate an estimated occupant movement based on the IMU_X value.

wherein, in response to the AEB indication, the ACU is configured to execute a mass spring damper model to calculate an estimated occupant movement based on the IMU_X value.

DETAILED DESCRIPTION

The disclosure relates to a vehicle safety system that implements occupant movement estimation in order to enhance the protection afforded to the occupant in the event of a crash. The system can tailor the actuation of actuatable protection devices, such as airbags and seatbelts, in response to the estimated occupant movement.

Vehicle Safety System

Figure 1:
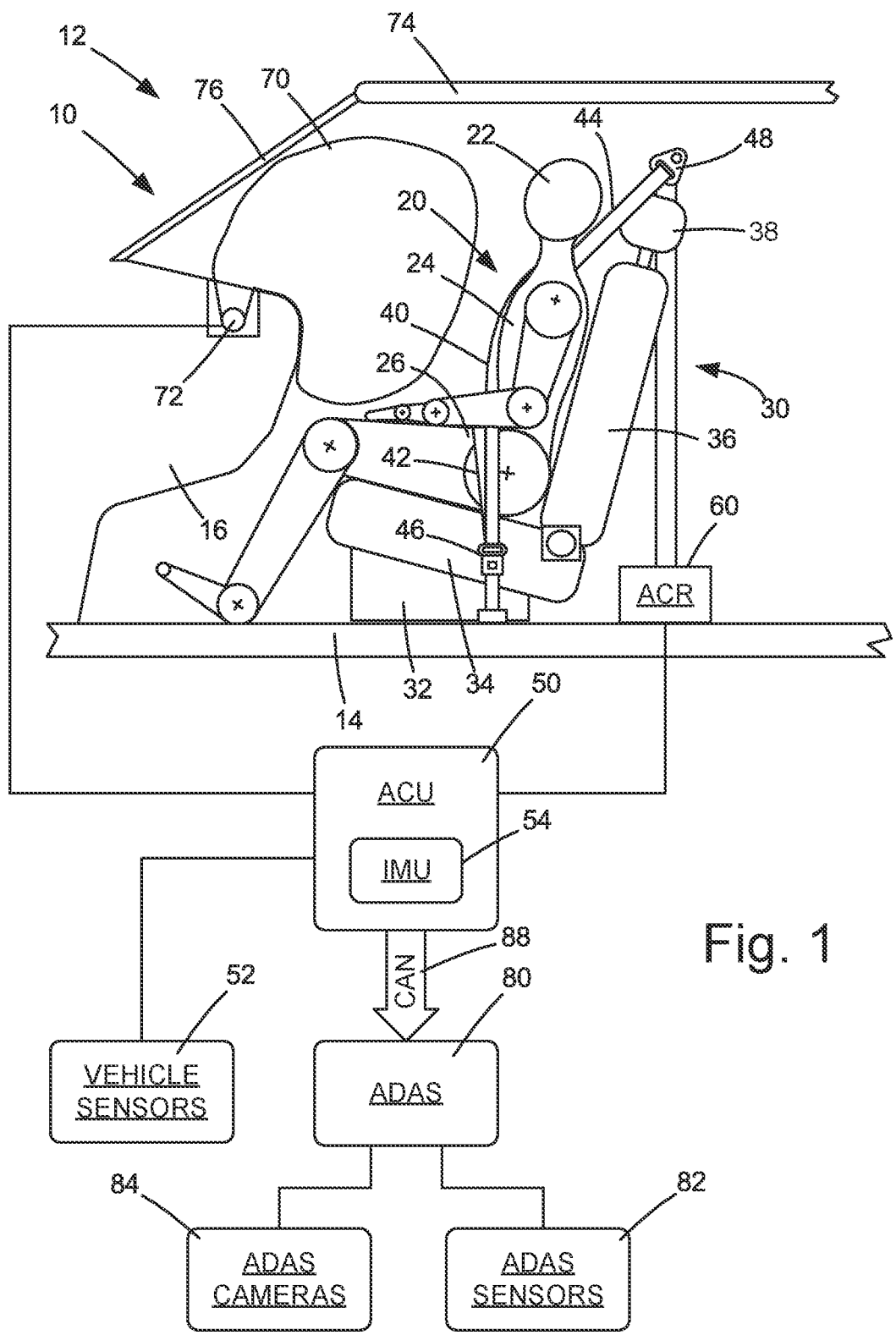
FIG. 1 is a schematic illustration of a safety system for helping to protect an occupant of a vehicle, according to one example configuration.

Referring to FIG. 1, according to one example configuration, a vehicle 12 includes a vehicle safety system 10 for helping to protect an occupant 20 of the vehicle. The system 10 that includes a central control unit, referred to herein as an airbag control unit (ACU) 50. The safety system 10 includes vehicle sensors 52 that are operatively connected to the ACU 50. The vehicle sensors 52 include vehicle/occupant condition sensors, such as seat weight sensors, seat occupancy sensors, seat position sensors, seat recline sensors, and seatbelt buckle latch sensors.

The vehicle sensors 52 can also include sensors (e.g., accelerometers) used to measure vehicle accelerations. These accelerations include longitudinal (X-axis), lateral (Y-axis), and vertical (Z-axis). Other accelerations, such as pitch, roll, and yaw can also be measured. While the vehicle sensors are illustrated as being external to and connected with the ACU 50, it will be appreciated that some sensors, such as the aforementioned accelerometers, can be implemented in the ACU 50 itself. This bundling of sensors in the ACU 50 can be referred to collectively as an inertia measurement unit (IMU) 54. The IMU 54 can produce vehicle acceleration signals along the X-axis (IMU_X), the Y-axis (IMU_Y), and the Z-axis (IMU_Z).

In FIG. 1, the vehicle sensors 52 are illustrated as providing the aforementioned condition signals directly to the ACU 50. The ACU 50 could, however, obtain some or all of these signals from other controllers or modules via a vehicle-based control area network (CAN) bus 88. For example, the vehicle 12 can include an occupant classification system (OCS) that utilizes various seat-based sensors, seatbelt sensors, and even interior mounted cameras to classify the occupant in order to tailor the protection afforded by the system 10. As another example, the vehicle 12 can include an Interior monitoring system (IMS) for process data from multiple interior sensors, such as interior cameras, interior radar sensors, seat weight sensors, buckle sensors, seat position sensors, seat angle sensors, etc. The IMS can use information from the sensors to classify vehicle occupants, using information, such as the camera-senses occupant position, radar sensed occupant position, seat weight sensor measured occupant weight, seat position sensor measured forward/rearward position, seat angle sensor measured occupant recline position, buckle sensor measured occupant buckled condition, etc.

The ACU 50 is also operatively connected to actuate one or more actuatable protection devices in the vehicle 12, such as an actuatable controlled restraint (ACR) 60 and a frontal airbag 70, both of which are shown in FIG. 1. Other actuatable protection devices that the ACU 50 can actuate include curtain airbags, thorax airbags, side airbags, and knee airbags. In response to signals obtained from the vehicle sensors 52, the ACU 50 is operative to determine the occurrence of an event, such as a crash, for which occupant protection is required and to control the actuation and/or deployment of the actuatable restraints in response thereto.

As shown in FIG. 1, the occupant 20 of the vehicle 12 is positioned on a vehicle seat 30. The seat 30 includes a seat base 32 for mounting the seat on a floor 14 of the vehicle 12. The base supports a bottom cushion 34 upon which the occupant 20 sits, a seat back 36 against which the occupant leans back against, and a head rest 38 for receiving the occupant's head 22.

A seatbelt 40 is connected to the ACR 60. In the example configuration shown in FIG. 1, the seatbelt 40 is a conventional three-point seatbelt that includes a lap belt portion 42 that is extensible across the occupants lap 26 and a shoulder belt portion 44 that is extensible over the occupant's shoulder and across the chest/torso 24. A buckle 46 secures the seatbelt 40 in the fastened condition shown in FIG. 1. A D-ring 48 guides the seatbelt 40 to the ACR 60.

The ACR 60 serves the purpose of a conventional seatbelt retractor. The ACR pays out seatbelt webbing to permit the occupant 20 to extend the shoulder portion 44 and lap portion 42 across his or her body and engage the buckle 46 in the buckled and restrained condition shown in FIG. 1. The ACR also retracts the seatbelt webbing when the occupant 20 unbuckles the seatbelt 40, placing the occupant in an unrestrained condition. Additionally, the ACR 60 can be configured to include components allowing it to function as a pre-tensioner and/or load limiter. For this purpose, the ACR 60 includes an inertial locking mechanism. The inertial locking mechanism can, for example, include a magnetic ball or sphere configured to move into a locking position in response to vehicle negative acceleration or, as used herein, deceleration that meets or exceeds a predetermined level.

The ACR 60 also includes a motor that is configured to actively control payout and retraction of the seatbelt webbing. The ACR 60 is operatively connected to the ACU 50, which is operable to control the ACR to actively payout and retract the seatbelt webbing. As described herein, the ACU 50 is configured to control the operation of the ACR 60 in response to vehicle conditions determined through the evaluation of data received from vehicle sensors.

When normal driving conditions are sensed, the ACU 50 is configured to place the seatbelt 40 in a normal restraint condition, pulled against the occupant 20 with a light amount of force sufficient just to remove slack from the belt and maintain the belt against the occupant's body, as shown in FIG. 1. In the normal restraint condition, the ACR 60 acts as an ordinary seatbelt retractor, taking up the seatbelt webbing with a light amount of force that can be easily paid out, for example, if the occupant leans forward.

The inertial locking mechanism will lock the retractor and prevent seatbelt payout when vehicle deceleration exceeds the predetermined level. If and when a crash occurs, the ACU 50 is configured to sense the event and actuate the ACR 60 to provide any desired tension control in response to the crash event. Conventional load limiting performance can also take place here, although it is typically passive in nature, provided mechanically through a structure, such as a torsion bar/torsion spring.

One advantage afforded by the ACR 60 is that of placing the seatbelt 40 in an enhanced restraint condition in response to detecting dangerous vehicle conditions, such as dangerous driving conditions, e.g., off-road driving, rough terrain, lateral skids, airborne vehicle conditions, etc. In the enhanced restraint condition, the ACR 60 tensions the seatbelt 40 around the occupant 20 in order to enhance the degree to which the occupant is restrained in the vehicle seat 30. Once driving conditions are determined to be normal, the ACU 50 can control the ACR 60 to place the seatbelt 40 in the normal restraint condition. Advantageously, the ACR 60 can place the seatbelt 40 in the enhanced restraint condition when a dangerous vehicle condition is detected, and can place the seatbelt in the normal restraint condition when the dangerous vehicle conditions end.

The frontal airbag 70 illustrated in FIG. 1 is a passenger frontal airbag. Other frontal airbags, such as a driver frontal airbag, can be implemented in the safety system 10, and its control and deployment can be controlled in the same or similar manner to that described herein with regard to the illustrated airbag 70. The frontal airbag 70 is mounted in an instrument panel 16 of the vehicle 12 and is deployable in response to the ACU 50 actuating an inflator 72. When deployed, the frontal airbag 70 is positioned between the instrument panel 16 and the occupant 20 and at least partially fills a space bounded by the instrument panel, roof 74 and windshield 76 of the vehicle 12.

To provide enhanced occupant protection, the inflator 72 can be a two-stage inflator, with a first or primary stage that is always actuated in response to a vehicle crash, and a second or secondary stage that is actuated only when sensed conditions dictate its use. The sensed conditions that can affect whether the second stage is actuated can include the crash severity, the occupant's size, the seat position, and the buckle latched indication. For example, the first and second stages can both be actuated in the event that the occupant is large (e.g., a large male) with the seat 30 positioned far from the instrument panel 16, As another example, the first stage only can be actuated in the event that the occupant is small (e.g., a small female or child) with the seat 30 positioned close to the instrument panel 16.

Advanced Driver Assistance System

The vehicle 12 can also include an advanced driver assistance system (ADAS) 80 that, for purposes of this description, is considered part of the vehicle safety system 10. The ADAS 80 assists the vehicle driver with functions such as parking, lane changing, crash avoidance, adaptive cruise control, electronic stability control, anti-lock brakes, emergency braking, traction control, blind spot information systems, lane departure warning, etc. Advanced driver assistance systems continue to be developed and can provide additional features such as active steering and automatic driving functions, with driverless vehicles on the horizon.

The ADAS 80 includes one or more controllers that communicate with various ADAS sensors 82 and cameras 84. The sensors 82 and cameras 84 provide information related to the vehicle 12 and its surroundings to the ADAS 80, which uses the data to execute calculations necessary to perform the various functions listed above. Because the ADAS 80 can perform so many functions, it can include a variety of individual controllers or modules tasked with performing one or more particular ADAS functions. For example, the ADAS 80 can include a stability control module and/or an anti-lock braking system (ABS) module.

The schematic representation of the ADAS 80 and its associated sensors 82 and cameras 84 is meant to encompass any and all system architectures that may be implemented in the vehicle 12. As shown in FIG. 1, the ADAS 80 can communicate data to and receive data from the ACU 50 via the CAN bus 88.

Occupant Movement Estimation

The vehicle safety system 10 is configured to implement a control algorithm that utilizes sensed vehicle and/or occupant data to estimate occupant movement in the event of an impending crash, and uses that estimated occupant movement to tailor the actuation and deployment of the actuatable protection devices, i.e., the ACR 60 and/or the frontal airbag 70. The control algorithm can, for example, be implemented in the ACU 50. The determination that a crash is impending can be made via the ADAS 80.

The ADAS 80 continuously evaluates the distances and relative velocities of the vehicle and other vehicles/objects in front of the vehicle to determine that a crash is impending. Initially, the ADAS 80 may issue an automatic emergency braking (AEB) deceleration flag, causing a visual/audible/tactile warning to the driver that braking is necessary. If the condition goes unresolved or worsens, the ADAS 80 and/or the stability control module can issue an AEB braking flag, which causes the vehicle brakes to be applied automatically. In some vehicles, the automatic braking can be executed in stages from partial braking to full braking.

Advantageously, the control algorithm implemented by the system 10 utilizes the AEB flags to trigger an estimation of occupant movement relative to the vehicle based on sensed vehicle longitudinal acceleration (i.e., negative acceleration or, as used herein, deceleration). The estimated occupant movement is calculated for movement of the occupant's head and the occupant's chest relative to the vehicle. The estimated occupant movement also takes into account the fact that initial occupant movement is essentially unrestrained, as the seatbelt 30 is configured to payout and, once a predetermined level of vehicle deceleration is exceeded, the seatbelt inertia mechanism of the ACR 60 will block seatbelt payout. Accordingly the estimated occupant movement includes a seatbelt unlocked component and a seatbelt locked component.

Mass-Spring Damper Model

The control algorithm implemented by the vehicle safety system 10 utilizes a mass-spring damper model to estimate the occupant movement relative to the vehicle. The use of a mass-spring damper model to estimate occupant movement in response to a crash is disclosed in U.S. Pat. No. 5,935,182 to Foo et al., the disclosure of which is hereby incorporated by reference herein in its entirety. The mass-spring damper modeling implemented in the system 10 is performed by the ACU 50 in a manner similar or identical to that disclosed by Foo et al. The principles of this modeling is described in the following paragraphs.

The occupant mass-spring model takes into account an occupant having a known or presumed mass. In the event of a vehicle crash, the vehicle acceleration resulting from the crash gives rise to the occupant moving forward relative to the vehicle. Vehicle acceleration is therefore the input to the model, which is used to estimate occupant movement. The seatbelt acts against the forward occupant movement. To account for this, the model implements a spring constant k representative of the seatbelt restraint. The model also implements a damping constant c representative of the frictional effect on the occupant resulting from the seatbelt system, such as payout, stretching, load-limiting, etc.

Considering that that occupants head and torso have different masses, that the torso is more closely restrained to the seat 30 by the seatbelt 40, and that the head can move relative to the torso, the system 10 can use the mass-spring damping model to estimate head movement separately from the torso movement. Because it is the occupant's chest that strikes the airbag 70, the calculations relating to estimated torso movement are referred to herein as chest movement. The calculations performed by the system 10 to estimate these movements are the same for both the head and chest, the only differences being the head/chest masses and their associated spring and damping constants.

Additionally, in a crash scenario, the seatbelt will initially payout seatbelt webbing and, eventually, the ACR 60 will lock the seatbelt 40 and load-limiting features will take over. Because of this, the spring and damping constants implemented in the mass-spring damper model will change as the vehicle crash progresses from a seatbelt not-locked, payout condition to seatbelt locked, load-limiting condition. Prior to seatbelt locking, the constants implemented in the model make little account for the seatbelt in the spring and damper constants. Once the seatbelt locks, the spring and damper constants are changed to take into account the significant effect the seatbelt has on occupant movement. Because of this, the system 10 implements four distinct equations for estimating occupant movement using mass-spring damper modelling:

Estimated head movement, without seatbelt force.
Estimated chest movement, without seatbelt force.
Estimated head movement, with seatbelt force.
Estimated chest movement, with seatbelt force.

Because these equations are so similar, the derivation of one equation for occupant movement is sufficient to convey the derivation of the others. Accordingly, the derivation of an equation for determining estimated occupant movement is illustrated below without reference to the body part for which the estimate is made, with the understanding that this equation is representative of the head and chest equations listed above. The following variables are implemented by the mass-spring damper modeling implemented in the system 10:

$x_1$=vehicle displacement.
$x_2$=occupant displacement.
$\dot{x}_1$=vehicle velocity.
$\dot{x}_2$=occupant velocity.
$\ddot{x}_1$=vehicle acceleration ($-\ddot{x}_1$=vehicle deceleration).
$\ddot{x}_2$=occupant acceleration.
$m_o$=occupant mass.
$k_o$=occupant spring constant.
$c_o$=occupant damping constant.

The equation for motion of the occupant is:

$$m_o\ddot{x}_2 = -k_o(x_2-x_1) - c_o(\dot{x}_2-\dot{x}_1) \quad \text{(Equation 1)}$$

Adding $-m_o\ddot{x}_1$ to both side of the equation:

$$m_o\ddot{x}_2 - m_o\ddot{x}_1 = -k_o(\ddot{x}_2-\ddot{x}_1) - c_o(\dot{x}_2-\dot{x}_1) \quad \text{(Equation 2)}$$

Defining a relative coordinate x that represents the distance that the occupant moves relative to the vehicle:

$$x = (x_2-x_1) \quad \text{(Equation 3)}$$

Substituting Equation 3 in Equation 2 yields an equation for occupant movement in general:

$$m_o\ddot{x} + c_o\dot{x} + k_o x = -m_o\ddot{x}_1 \quad \text{(Equation 4)}$$

Using Equation 4, the estimated occupant movement relative to the vehicle, x, is can be calculated based on the input of vehicle acceleration, $\ddot{x}_1$. From this, it will be appreciated that the system 10 can extrapolate and implement four distinct mass-spring damper models to determine estimated movement that is specific to the occupants head and chest, both with and without seatbelt force scenarios:

Estimated head movement, without seatbelt force:

$$m_h \ddot{x} + c_h \dot{x} + k_h x = -m_h \ddot{x}_1 \quad \text{(Equation 5)}$$

Estimated chest movement, without seatbelt force:

$$m_c \ddot{x} + c_c \dot{x} + k_c x = -m_c \ddot{x}_1 \quad \text{(Equation 6)}$$

Estimated head movement, with seatbelt force:

$$m_{hsb} \ddot{x} + c_{hsb} \dot{x} + k_{hsb} x = -m_{hsb} \ddot{x}_1 \quad \text{(Equation 7)}$$

Estimated chest movement, with seatbelt force:

$$m_{csb} \ddot{x} + c_{csb} \dot{x} + k_{csb} x = -m_{csb} \ddot{x}_1 \quad \text{(Equation 8)}$$

where:
- $m_h$ = occupant head mass.
- $m_c$ = occupant chest mass.
- $k_h$ = occupant head spring constant without seatbelt force.
- $c_h$ = occupant head damping constant without seatbelt force.
- $k_c$ = occupant chest spring constant without seatbelt force.
- $c_c$ = occupant chest damping constant without seatbelt force.
- $k_{hsb}$ = occupant head spring constant with seatbelt force.
- $c_{hsb}$ = occupant head damping constant with seatbelt force.
- $k_{csb}$ = occupant chest spring constant with seatbelt force.
- $c_{csb}$ = occupant chest damping constant with seatbelt force.

Signal Conditioning and Model Implementation

Figure 2:
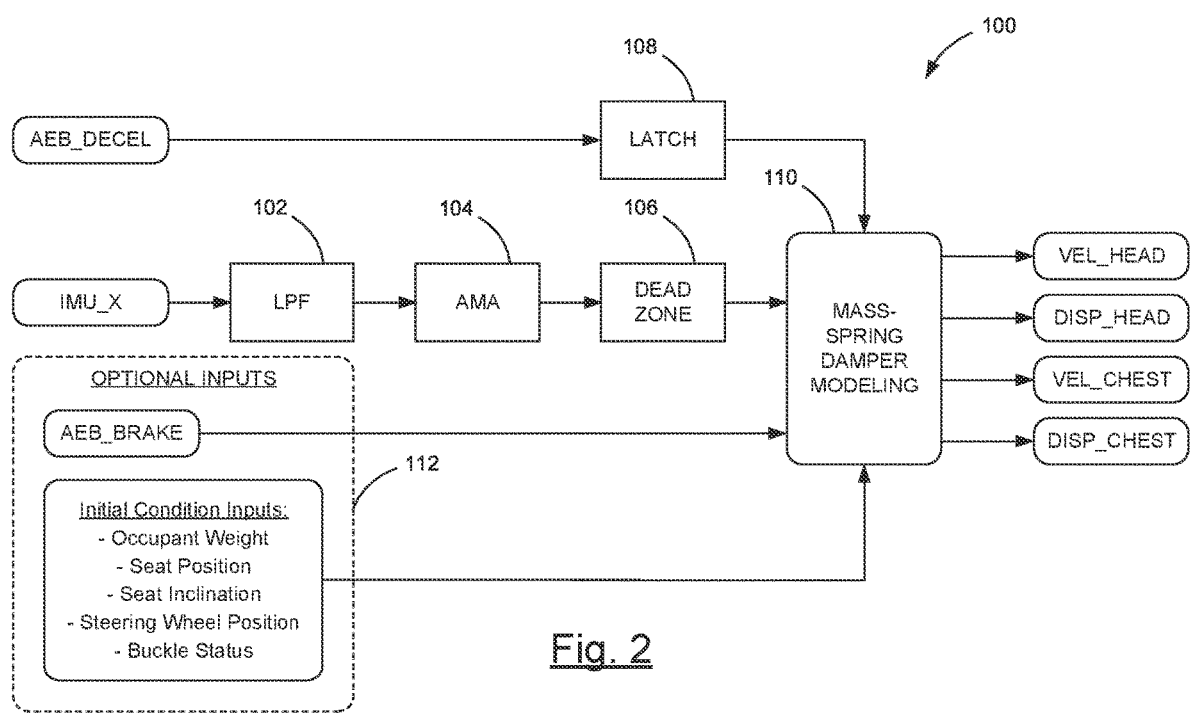
FIG. 2 is a block diagram illustrating a portion of an algorithm implemented in the safety system.

FIG. 2 is a block diagram illustrating an occupant movement estimation algorithm 100 implemented in the vehicle safety system 10. The occupant head and chest movement estimation equations 5-8 are implemented in a mass spring damper modeling function 110 implemented in the algorithm 100. The occupant movement estimation algorithm 100 in FIG. 2 also illustrates some of the signal conditioning that sensor data undergoes prior to being implemented in the modeling function 110. In the example configuration of the vehicle safety system illustrated herein, at least a portion of the algorithm 100 can be implemented in the ACU 50.

As shown in FIG. 2, the vehicle longitudinal acceleration signal IMU_X measured by the IMU 54 incorporated in the ACU 50 is provided to a low pass filtering function (LPF 102) to eliminate high frequency noise, such as engine or road vibrations, from the signal. For this purpose, the LPF 102 can, for example, have a cut-off frequency=8 Hz. The low pass filtered acceleration signal from LPF 102 is provided to an acceleration moving average calculation function (AMA 104) to smooth the filtered acceleration signal. For this purpose, AMA 104 has a tunable window, which, in an example implementation, can be 0.05 seconds.

The filtered moving averaged signal from AMA 104 is provided to a dead zone filter 106 that filters out small accelerations that can act as noise in the system. In one example implementation, the dead zone filter 106 can filter out accelerations in the range of ±0.05 G. The conditioned signal from block 106 is provided to the mass spring damper model function 110, which is configured to evaluate the conditioned vehicle longitudinal acceleration IMU_X as $\ddot{x}_1$ in equations 5-8 above to estimate occupant head and chest movements both with and without seatbelt force applied.

As also shown in FIG. 2, an automatic emergency braking deceleration flag (AEB_DECEL) is provided to latch block 108. In the example configuration of the system 10 illustrated herein, the AEB_DECEL flag can be obtained by the ACU 50 from the ADAS 60 via the CAN bus 88. The AEB_DECEL flag indicates that the ADAS 60 has detected an object, such as another vehicle, in the path of the vehicle 12, that a collision may ensue, and that vehicle deceleration is necessary. The AEB_DECEL flag is therefore a command for automatic emergency braking to take place. Because the AEB_DECEL signal is not maintained throughout the AEB braking profile, it is latched at block 108 for a predetermined time period, which can be tuned to the braking actuation profile implemented by the ADAS 60. The latch period can, for example, be about 3 seconds.

Latch block 108 acts as a Boolean switch for the mass spring damper model function 110, which is activated to perform the occupant movement estimation calculations of equations 5-8 in response to latch block 108 being activated or ON. As shown in FIG. 2, the mass spring damper model function 110 can produce estimated displacements and velocities of the occupant's head and chest that will occur in response the ADAS 60 detecting an automatic braking scenario. Mass spring damper calculations performed by the model 110 are known and can be performed, for example, in the manner disclosed in the aforementioned U.S. Pat. No. 5,935,182 to Foo et al., which is incorporated herein by reference.

Seatbelt Force Switching

Figure 3:
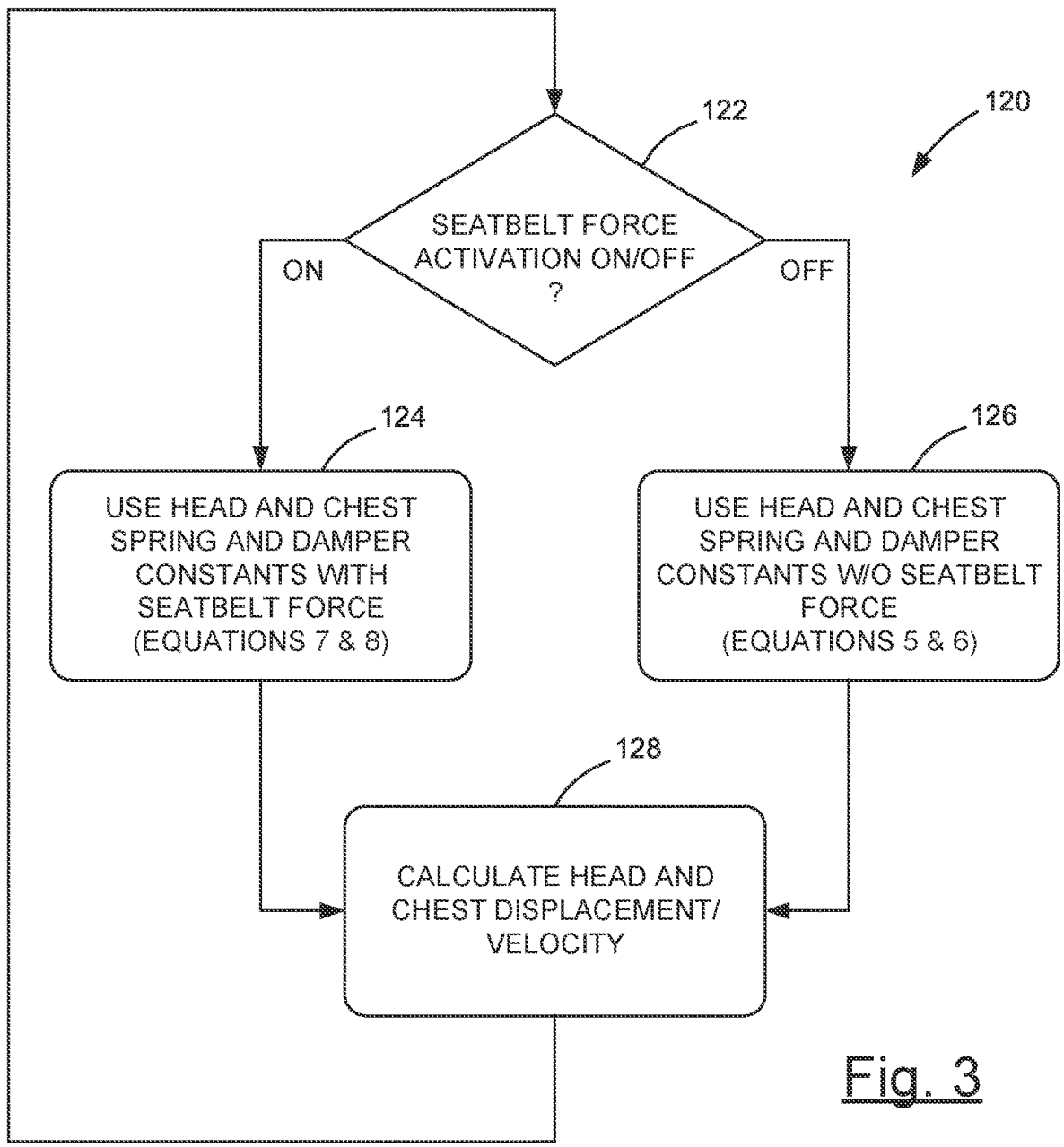
FIG. 3 is a flowchart illustrating a portion of the algorithm implemented in the safety system.

FIG. 3 is a flow chart that illustrates a seatbelt force switching process or function 120 implemented by the mass spring damper model function 110. As shown in FIG. 3, the switching function 120 is a loop function that is updated continuously while the model function 110 is active, i.e., when latch block 108 is ON and activating the function.

At step or block 122, a determination is made as to whether the seatbelt activation force is ON. This determination is whether the inertial locking mechanism of the ACR 60 is actuated. Since the inertial locking mechanism is mechanical, e.g., a magnetic ball or sphere configured to move into a locking position in response to vehicle deceleration that meets or exceeds a predetermined level, there is no active signal that can be polled for this determination. This determination is therefore made via software modeling, which is described in conjunction with FIG. 4, below.

If, at block 122, the determination is made that the seatbelt activation force is not ON, as indicated by the line labeled "OFF," the function 120 proceeds to step or block 126, and Equations 5 and 6, using head and chest spring and damper constants for the without seatbelt force scenario, are implemented in the model. The function 120 then proceeds to step or block 128, where the occupant's displacement and velocity are calculated using equations 5 and 6.

If, at block 122, the determination is made that the seatbelt activation force is ON, as indicated by the line labeled "ON," the function 120 proceeds to step or block 124, and Equations 7 and 8, using head and chest spring and damper constants for the with seatbelt force scenario, are implemented in the model. The function 120 then proceeds to step or block 128, where the occupant's displacement and velocity are calculated using equations 7 and 8.

Seatbelt Force Determination

Figure 4:
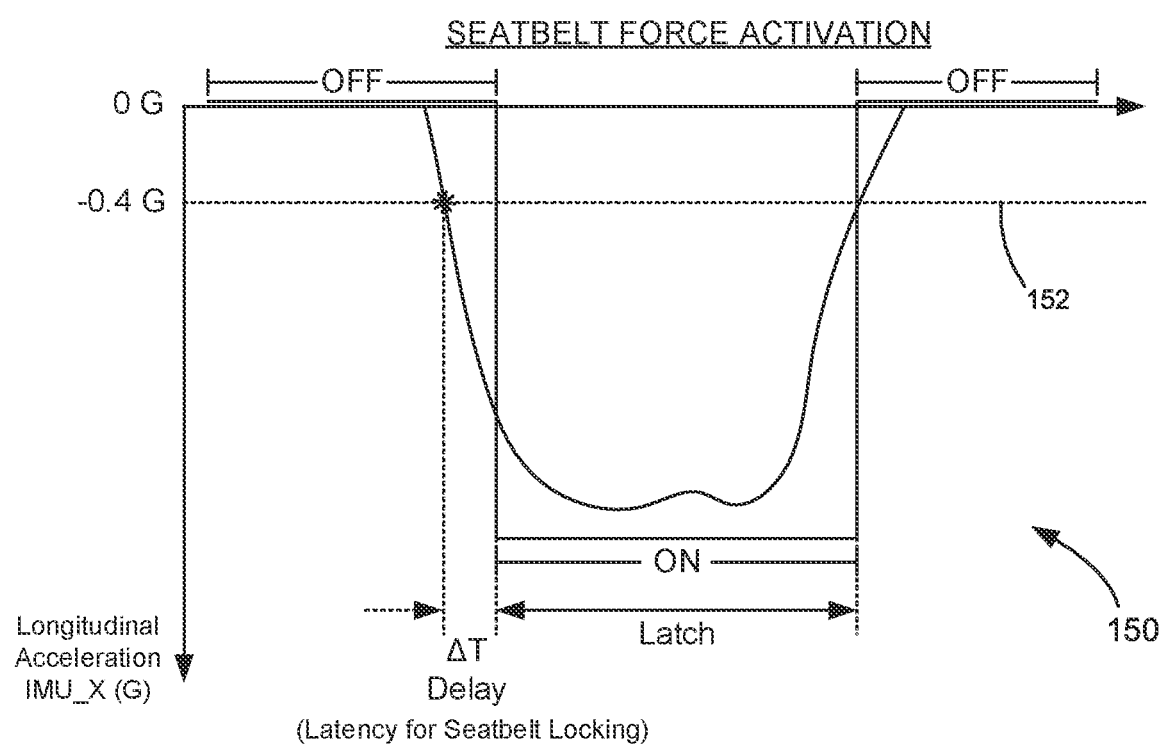
FIG. 4 illustrates a metric implemented by the algorithm implemented in the safety system.

FIG. 4 is a graphic illustration of a software metric for determining whether the seatbelt activation force is ON or OFF. This metric determination is implemented at step or block 122 of the switching process/function 120 of FIG. 3.

As shown in FIG. 4, the model is implemented as a seatbelt force activation metric, indicated generally at 150, that is implemented in the system 10, e.g., as a component or module of the occupant movement estimation algorithm 100 implemented in the system. The seatbelt force activation metric 150 can, for example, be a component or module of the mass spring damper model 110 implemented in the ACU 50.

The seatbelt force activation metric 150 evaluates vehicle longitudinal acceleration IMU_X over time. Because braking involves negative acceleration (deceleration), the metric 150 illustrates the acceleration values in the negative direction, i.e., downward as viewed in FIG. 4. The IMU_X evaluated by the metric 150 can be the conditioned, filtered value from dead zone block 106 of FIG. 2. The metric 150 determines whether IMU_X negative acceleration exceeds a predetermined magnitude corresponding to the point at which the inertial locking mechanism of the ACR 60 should lock. This magnitude can be tuned for the particular configuration of the ACR 60, the particular vehicle platform, or any specific requirements from the vehicle manufacturer. In the example implementation of the seatbelt force activation metric 150 of FIG. 4, the predetermined IMU_X deceleration value indicative of locking of the ACR inertial seatbelt locking mechanism is 0.4 G, as indicated by the threshold 152 shown in dashed lines in FIG. 4. This value is, however, tunable, as mentioned above.

The relationship of the metric value to the ON/OFF status of the seatbelt force activation signal is illustrated in FIG. 4. The magnitude of the longitudinal vehicle acceleration IMU_X is evaluated over time, which is represented on the horizontal axis of the metric 150, to determine whether it meets or exceeds a predetermined magnitude. In the example implementation of FIG. 4, the predetermined magnitude is 0.4 G, which is shown in dashed lines in FIG. 4. As shown in the graphic representation of the metric 150, the curve 152 representing IMU_X hovers at or about zero G until a point in time where vehicle deceleration takes place, at which time the metric departs from zero and the magnitude of the IMU_X negative acceleration increases. During this time, the output of the seatbelt force activation metric 150 is OFF.

When the IMU_X negative acceleration crosses the threshold 152, a time delay ($\Delta T$) can be triggered to account for latency in the ACR inertial seatbelt locking mechanism, During this time delay, the output of the seatbelt force activation metric 150 remains OFF. Once the time delay expires, the output of the seatbelt force activation metric 150 transitions to ON and is latched ON for a predetermined period of time or until the magnitude of the metric falls below the threshold (0.4 G).

Through the implementation of the metric 150, the seatbelt force activation ON/OFF determination at block 122 of the seatbelt force switching function 120 is made. The function 120 allows for the stiffer spring and damping constants used with Equations 7 and 8 to be implemented in the mass spring damper model function 100 when the ACR inertial seatbelt locking mechanism is locked, and for the less stiff constants to be used with Equations 5 and 6 when the mechanism is not locked. Examples of the constants, parameters, and tolerances implemented in the occupant movement estimation algorithm 100 are illustrated in the following table:

| Occupant Movement Estimation Algorithm Constants, Parameters, Tolerances | | |
|---|---|---|
| Head: | Chest: | Transition: |
| $m_h$ = 5 kg | $m_c$ = 55 kg | $\Delta T$ Delay = 0.6 s |
| $k_h$ = 160 N/m | $k_c$ = 1757 N/m | Inertia SB Lock = 0.4 G |

-continued

| Occupant Movement Estimation Algorithm Constants, Parameters, Tolerances | | |
|---|---|---|
| Head: | Chest: | Transition: |
| $c_h$ = 42 Ns/m | $c_c$ = 932 Ns/m | IMU_X Tolerance: |
| $k_{hsb}$ = 220 N/m | $k_{csb}$ = 3895 N/m | Gain: ±3% |
| $c_{hsb}$ = 50 Ns/m | $c_{csb}$ = 1388 Ns/m | Offset: ±0.2 m/s² |

This allows the occupant movement estimation algorithm 100 to more accurately estimate occupant movement and velocity in response to automatic braking scenarios detected by the ADAS 80 by calculating both seatbelt locked and seatbelt unlocked estimates.

The improved occupant movement estimates can be implemented by the vehicle safety system 10 to improve control deployment of the ACR 60 and/or the airbag 70. For example, the safety system 10 can be configured to pretension the seatbelt 40 at different times and/or to different degrees based on the improved estimated occupant displacement and/or velocity. As another example, the safety system 10 can be configured to control the actuation of first and second stages of the inflator 72, such as the timing at which the stages are fired, or whether to fire the second stage at all, based on the improved estimated occupant displacement and/or velocity.

Improvements to Occupant Movement Estimation Algorithm

Advantageously, the occupant movement estimation algorithm 100 implemented in the vehicle safety system 10 can achieve good performance while relying on only two inputs, IMU_X and AEB_DECEL to perform the calculations and determinations described above. Improvements can, however, be made to the performance of the algorithm 100. For example, the algorithm 100 can be improved through providing additional inputs to the algorithm, supplying additional parameters to the algorithm, or by making certain static values or parameters implemented in the algorithm dynamic.

Initial Condition Inputs

The performance of the occupant movement estimation algorithm 100 implemented in the vehicle safety system 10 can be improved by providing additional inputs that can be used to better calculate the estimated position of the occupant relative to vehicle structure, such as the steering wheel and/or instrument panel. For example, knowing the occupant's position relative to vehicle structure at the time the AEB_DECEL is issued allows the occupant movement estimation algorithm 100 to determine the occupant's position resulting from the estimated movement, which can help inform the decision on how to deploy the safety devices, e.g., seatbelt pre-tensioning and/or inflator 1st/2nd stage actuation.

To achieve improved performance of the algorithm 100 through the provision of initial condition data, optional inputs, indicated generally at 112 in FIG. 2, can be implemented in the occupant movement estimation algorithm 100 to help refine and/or improve the performance of the algorithm. As shown in FIG. 2, the additional inputs 112 can include an AEB_BRAKE flag and one or more initial condition inputs. For the additional initial condition inputs, the following values can be provided:

| Value: | Purpose: | Source: |
|---|---|---|
| Occupant Weight | Actual Weight Implemented in Estimation Algorithm | Occupant Classification System (OCS) Interior Camera System |
| Seat Position | Actual Occupant Position Relative to Vehicle Structure | Seat Track Position Sensor Interior Monitoring System Interior Camera System |
| Seat Inclination | Actual Occupant Position Relative to Vehicle Structure | Seat Recline Sensor Interior Monitoring System Interior Camera System |
| Steering Wheel/ Instrument Panel Position | Actual Occupant Position Relative to Vehicle Structure | Interior Monitoring System Interior Camera System Calibratable Parameter |
| Seatbelt Buckle Status | Seatbelt Force Modeling for ACR | Buckle Sensor Interior Camera System |

The occupant weight input can be implemented in the occupant movement estimation equations 5-8 as a dynamic variable, as opposed to a constant. Using the actual occupant weight, as opposed to a presumed weight, can improve the accuracy and responsiveness of the estimated occupant head and chest movements. While the occupant actual weight might not have that great of an effect on the head mass (nm) implemented in the equations, it can have a great effect on the torso/chest mass (m) implemented in the equations. For example, where the actual occupant weight is available to the occupant movement estimation algorithm 100, the chest mass ($m_c$) can be calculated as a predetermined percentage of the occupant weight.

The seat position input and/or seat inclination input and/or steering wheel/instrument panel position input can be implemented to improve the calculation of distance between the occupant and the vehicle structure. This distance can be used in conjunction with the estimated occupant movement and/or velocity to determine how to tune the actuation of the protection devices, the airbag 70 and/or the ACR 60. For example, based on any combination of these inputs, the ACU 50 can:

Delay/accelerate seatbelt tensioning.
Delay/accelerate seatbelt load limiting.
Delay/accelerate $2^{nd}$ stage inflator actuation.
Delay/accelerate actuatable airbag venting.

For example, if these inputs indicate that the occupant is close to the instrument panel/steering wheel, or is an out-of-position (OOP) occupant, the ACU 50 can be configured to control the ACR 60 to increase the magnitude and/or timing of seatbelt pre-tensioning and/or load limiting. Additionally, the ACU 50 can also adjust the timing of the $1^{st}/2^{nd}$ stages of the inflator 72. The ACU 50 can determine whether or not to actuate the $2^{nd}$ stage at all due to the close/OOP occupant. The ACU 50 can further determine whether to actuate the active venting in response to the close/OOP occupant. As another example, if these inputs indicate that the occupant is sufficiently distanced from the vehicle structure, the ACU 50 can control the ACR 60 to decrease the tension and/or timing of the seatbelt pre-tensioning. The ACU 50 can also adjust the timing of the $1^{st}/2^{nd}$ stages of the inflator 72. The ACU 50 can also determine whether actuating the 2 nd stage of the inflator is necessary. The ACU 50 can further determine whether to actuate the active venting or adjust the timing of the active venting in response to the distance between the occupant and the vehicle structure.

The buckle status input can be implemented to improve the response of the system 10 in the event of an unbuckled occupant. If the buckle status input indicated that the occupant is buckled, the system 10 can implement the occupant movement estimation algorithm 100 as described above. The ACU 50 can control actuation of the ACR 60 to pre-tension the seatbelt in the normal manner, and the ACR and airbag 70 can be deployed according to the occupant estimated movements, utilizing both the with seatbelt force and without seatbelt force calculations (equations 5-8). The buckle status input can help determine whether to include $1^{st}/2^{nd}$ stage actuation and the timing thereof, as well as actuation of active venting and its timing.

If, however, the buckle status indicates that the occupant is not buckled, the system 10 can implement a modified version of the occupant movement estimation algorithm 100, In this scenario, seatbelt pre-tensioning is irrelevant and, therefore, actuating the ACR 60 is unnecessary and will not help protect the occupant. To account for this, the modified version of the occupant movement estimation algorithm 100 is triggered, and the occupant estimated movements are calculated with the without seatbelt force calculations only, i.e., with equations 5 and 6 only. As a result, the estimated displacement and velocity will be substantially increased.

Taking into account the increased values for estimated occupant displacement and velocity, and with the realization that the seatbelt is inoperative to help protect the occupant, the ACU 50 can tailor the actuation of the airbag 70. This tailoring can be performed with or without any of the other additional inputs to further tailor the airbag actuation, as described above. For example, the ACU 50 can actuate the $1^{st}$ and/or $2^{nd}$ stages of the inflator 72 sooner in response to the sensed crash event based on the determination that the unbuckled occupant will strike the bag sooner than a buckled occupant. The ACU 50 can also control active venting appropriately.

AEB Braking Flag (AEB_BRAKE)

The AEB braking flag AEB_BRAKE is issued by the vehicle stability control module and can be received by the ACU 50 via the CAN bus 88 for implementation in the occupant movement estimation algorithm 100. The AEB_BRAKE flag is active throughout the entire AEB braking profile and therefore can be used either to supplement the implementation of the AEB_DECEL flag or to replace that flag altogether. For example, the AEB_DECEL flag can be used in the manner described, i.e., latched ON to initiate occupant movement estimation (see FIG. 2). The AEB_BRAKE flag can be used to unlatch the AEB_DECEL flag and take over, with the occupant movement estimation continuing for the duration of the AEB_BRAKE flag, as opposed to the predetermined latch time at block 108. In another example implementation, the AEB_BRAKE flag could replace the AEB_DECEL flag so the occupant movement estimation only takes place during actual AEB braking.

E-Lock and other ACR Features

Some configurations of the ACR 60 can include what is referred to as an E-lock. An E-lock feature replaces the conventional mechanical seatbelt retractor locking mechanism with an electronic locking mechanism, such as a solenoid. Actuation of the E-lock is controlled via an inertia sensor, which can be local to the ACR 60 or can be the IMU_X inertia sensor in the ACU 50. In either case, when the inertia sensor meets or exceeds a predetermined negative acceleration value, such as the aforementioned 0.4 G, an E-lock command can be generated, either internally to the ACR 60 or at the ACU 50, wherever the inertia sensing is performed. If performed at the ACU 50, the E-lock command can be sent to the ACR 60 via the CAN bus 88.

The E-lock feature can replace the seatbelt force activation metric 150 illustrated in FIG. 4. The E-lock command can therefore replace the determination made at block 122 of the seatbelt force switching process or function 120 (see FIG. 3). In this instance, the determination would be whether the E-lock command is present. If the E-lock command is present, the process 120 proceeds to block 124 and the head and chest spring and damper constants with seatbelt force equations 7 and 8 are used for the mass spring damper modeling. If the E-lock command is not present, the process 120 proceeds to block 126 and the head and chest spring and damper constants without seatbelt force equations 5 and 6 are used for the mass spring damper modeling.

Another feature that can be enabled by the ACR 60 involves improved occupant movement estimation through the ACR interface. For example, the ACR 60 can include payout/retraction sensors that monitor or count the amount of seatbelt webbing paid out and retracted. These sensors can provide payout/retraction values to the ACU 50, for example, via the CAN bus 88. These values, particularly the payout value, can be useful in providing a direct indication of occupant movement, as opposed to an estimated movement. The payout value can therefore be used as a feedback not only for indicating the distance that the occupant moves, but also as a positive indication that occupant movement has commenced.

From the above description of the disclosure, those skilled in the art will perceive improvements, changes and modifications. For example, the seatbelt illustrated herein is associated with an ACR 60. The system 10 and, particularly, the control algorithms disclosed herein, can be implemented without an ACR 60 and instead with a seatbelt with a traditional seatbelt retractor. Of course, some features described herein do, in fact, require the ACR 60 to function, but the ACR is necessary only for those features that require its presence. These and other such improvements, changes, and/or modifications within the skill of the art are intended to be covered by the appended claims.

Having described the invention, the following is claimed:

1. A method for controlling an actuatable safety device for protecting an occupant of a vehicle, the method comprising:
sensing an impending vehicle collision by receiving an automatic emergency braking (AEB) deceleration flag;
in response to sensing the impending vehicle collision, calculating an estimated occupant movement corresponding to when the impending vehicle collision occurs; and
controlling the actuatable safety device in response to the estimated occupant movement.

2. The method recited in claim 1, wherein receiving the AEB deceleration flag comprises polling an advanced driver assistance system (ADAS) that implements sensors that detect objects in the vicinity of the vehicle, calculates relative velocities between the detected objects and the vehicle to sense the impending vehicle collision, and outputs the AEB deceleration flag in response thereto.

3. The method recited in claim 2, further comprising latching the AEB deceleration flag for a predetermined time period that estimates the duration of an AEB braking profile.

4. The method recited in claim 1, wherein calculating the estimated occupant movement comprises executing spring mass damper modeling to estimate the occupant movement.

5. The method recited in claim 4, wherein executing spring mass damper modeling comprises evaluating vehicle longitudinal acceleration (IMU_X) with a spring mass damper model to estimate the occupant movement.

6. The method recited in claim 4, wherein executing the spring mass damper modeling comprises implementing a first spring mass damper model that estimates occupant head movement, and a second spring mass damper model that estimates occupant chest movement.

7. The method recited in claim 4, wherein executing the spring mass damper modeling comprises implementing a first spring mass damper model that estimates occupant movement with the seatbelt in an unlocked condition allowing seatbelt webbing payout, and a second spring mass damper model that estimates occupant movement with the seatbelt in a locked condition blocking seatbelt webbing payout.

8. The method recited in claim 7, further comprising:
executing a metric to that evaluates a magnitude of vehicle longitudinal acceleration (IMU_X) over time;
implementing the first spring mass damper model in response to the magnitude of vehicle longitudinal acceleration remaining below a predetermined threshold associated with mechanical seatbelt locking; and
implementing the second spring mass damper model in response to the magnitude of vehicle longitudinal acceleration exceeding the predetermined threshold associated with mechanical seatbelt locking.

9. The method recited in claim 7, further comprising:
polling an E-lock status of an actuatable controlled restraint seatbelt;
implementing the first spring mass damper model in response to the E-lock status being OFF; and
implementing the second spring mass damper model in response to the E-lock status being ON.

10. The method recited in claim 7, further comprising:
sensing a seatbelt buckle status; and
inhibiting the implementation of the second spring mass damper model in response to the seatbelt buckle status being unbuckled.

11. The method recited in claim 4, wherein executing the spring mass damper modeling comprises implementing:
a first spring mass damper model that estimates occupant head movement with the seatbelt in an unlocked condition allowing seatbelt webbing payout;
a second spring mass damper model that estimates occupant chest movement with the seatbelt in an unlocked condition allowing seatbelt webbing payout;
a third spring mass damper model that estimates occupant head movement with the seatbelt in a locked condition blocking seatbelt webbing payout; and
a fourth spring mass damper model that estimates occupant chest movement with the seatbelt in a locked condition blocking seatbelt webbing payout.

12. The method recited in claim 11, further comprising:
executing a metric to that evaluates a magnitude of vehicle longitudinal acceleration (IMU_X) over time;
implementing the first and second spring mass damper models in response to the magnitude of vehicle longitudinal acceleration remaining below a predetermined threshold associated with mechanical seatbelt locking; and
implementing the third and fourth spring mass damper models in response to the magnitude of vehicle longitudinal acceleration exceeding the predetermined threshold associated with mechanical seatbelt locking.

13. The method recited in claim 1, wherein controlling the actuatable safety device in response to the estimated occupant movement comprises at least one of:
determining whether to actuate a first and/or second stage of an inflator for inflating an airbag;

determining timing with which to actuate a first and/or second stage of an inflator for inflating an airbag;
determining whether to actuate an actuatable vent for venting inflation fluid from an airbag;
determining timing with which to actuate an actuatable vent for venting inflation fluid from an airbag;
determining whether to actuate a seatbelt load limiter;
determining whether to actuate a seatbelt pre-tensioner; and
determining whether to actuate an actuatable controlled restraint (ACR) to tighten a seatbelt onto the occupant.

14. The method recited in claim 1, wherein calculating the estimated occupant movement that will result when the impending vehicle collision occurs further comprises at least one of:
   implementing a sensed occupant weight to calculate the estimated occupant movement;
   implementing a sensed seat position to calculate an occupant position relative to vehicle structure;
   implementing a sensed seat inclination to calculate an occupant position relative to vehicle structure;
   implementing a sensed steering wheel and/or instrument panel position to calculate an occupant position relative to vehicle structure;
   implementing a sensed seatbelt buckle status to calculate the estimated occupant movement.

15. A vehicle safety system comprising:
   an actuatable safety device comprising at least one of an airbag inflator, an actuatable airbag vent, and actuatable seatbelt retractor and an actuatable controlled restraint comprising a seatbelt retractor;
   a sensor for sensing an impending vehicle collision wherein the sensor comprises a sensor of an advanced driver assistance system configured to assist the driver in driving functions; and
   a controller comprising an airbag control unit configured to:
      in response to the sensor sensing the impending vehicle collision, calculate an estimate occupant movement corresponding to when the impending vehicle collision occurs; and
      controlling the actuatable safety device in response to the estimated occupant movement.

16. A vehicle safety system comprising:
   an airbag module comprising an airbag and an inflator actuatable to provide inflation fluid for inflating and deploying the airbag;
   an airbag control unit (ACU) configured to control actuation of the inflator and the inflation and deployment of the airbag, the airbag control unit comprising an inertial monitoring unit (IMU) operative to measure a vehicle longitudinal acceleration and provide a vehicle longitudinal acceleration (IMU_X) value indicative thereof;
   wherein the ACU is configured to obtain from at least one of an advanced driver assistance system (ADAS) and a vehicle stability control system a vehicle automatic emergency braking (AEB) indication; and
   wherein, in response to the AEB indication, the ACU is configured to execute a mass spring damper model to calculate an estimated occupant movement based on the IMU_X value.

17. A method for controlling an actuatable safety device for protecting an occupant of a vehicle, the method comprising:
   sensing an impending vehicle collision by receiving an automatic emergency braking (AEB) braking flag;
   in response to sensing the impending vehicle collision, calculating an estimated occupant movement corresponding to when the impending vehicle collision occurs; and
   controlling the actuatable safety device in response to the estimated occupant movement.

18. The method recited in claim 17, wherein receiving the AEB deceleration flag comprises polling a vehicle stability system for the AEB deceleration flag, which is flagged ON throughout the duration of an AEB braking profile.

* * * * *